(No Model.)
C. F., A. W. & A. L. LAWTON.
PROCESS OF MANUFACTURING SALT.
No. 475,576. Patented May 24, 1892.
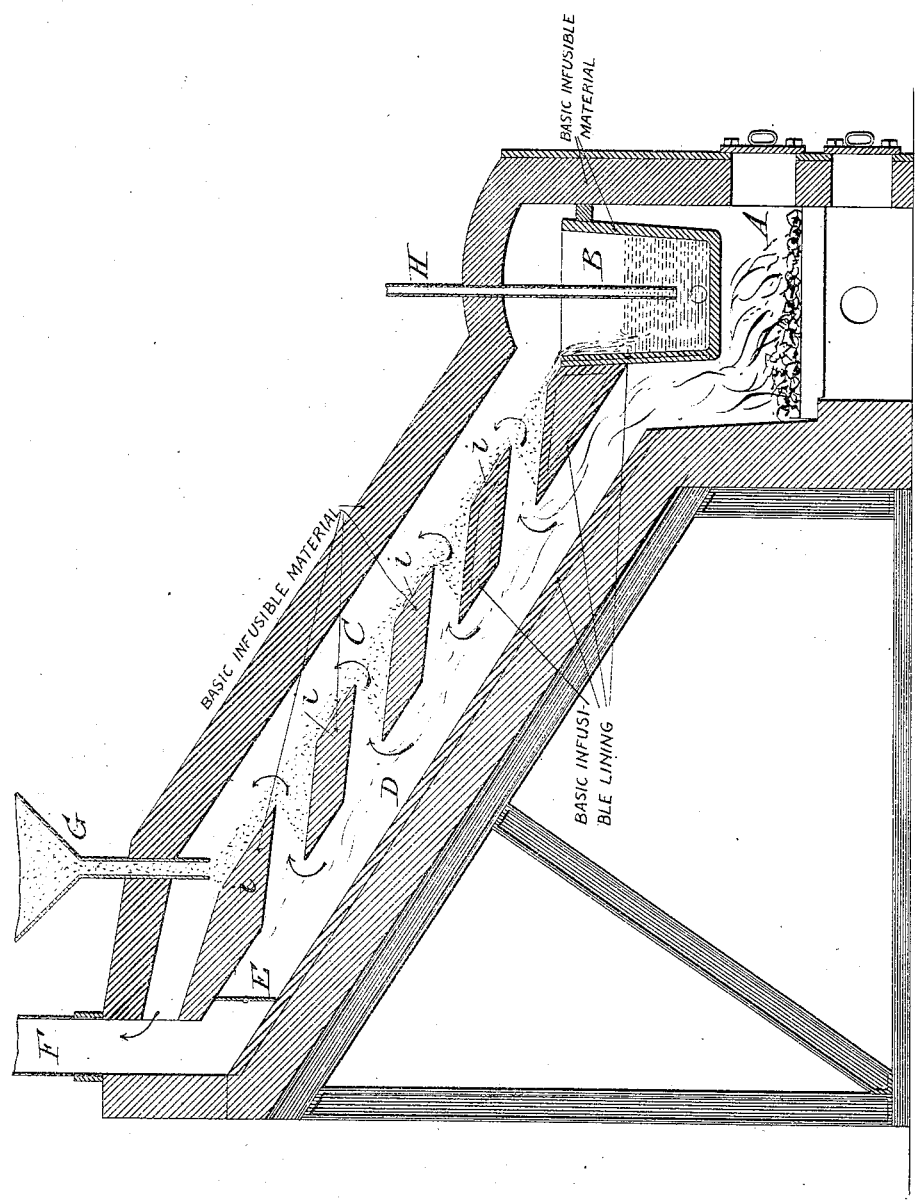
Attest
Sidney P. Hollingsworth
Horace A. Dodge
Charles F. Lawton
Albert L. Lawton
Arthur W. Lawton
Inventors,
by Dodge Sons.

UNITED STATES PATENT OFFICE.

CHARLES F. LAWTON, ARTHUR W. LAWTON, AND ALBERT L. LAWTON, OF ROCHESTER, NEW YORK.

PROCESS OF MANUFACTURING SALT.

SPECIFICATION forming part of Letters Patent No. 475,576, dated May 24, 1892.

Original application filed February 9, 1891, Serial No. 380,783. Divided and this application filed January 2, 1892. Serial No 416,827. (No specimens.)

*To all whom it may concern:*

Be it known that we, CHARLES F. LAWTON, ARTHUR W. LAWTON, and ALBERT L. LAWTON, citizens of the United States, residing at Rochester, in the county of Monroe and State of New York, have invented certain new and useful Improvements in the Process of Manufacturing Salt, of which the following is a specification, this specification being a division of an application, Serial No. 380,783, filed by us February 9, 1891.

Our invention relates to the manufacture of salt, (chloride of sodium,) and has reference more particularly to a process for the purification and whitening thereof.

Briefly stated the invention consists in the process of providing a furnace, chamber, or other suitable receptacle with a protecting face or lining of basic infusible material, placing salt therein, and subjecting the salt to a fusing heat, advisably adding to the salt, before or after fusion, alkaline material.

One form of apparatus for carrying out the invention is, for the purposes of illustration, shown in the drawing, which is a vertical sectional view of a furnace. This form gives good results; but we wish it understood that we do not limit ourselves to the construction shown or to any particular form, as many other forms of melting-furnaces may be substituted with equally good results.

The apparatus here shown consists of a fire-place A, a receptacle B for the melted or fused salt, two flues or passages C and D, the former directly over the latter and inclined, as shown, and a series of steps *i i i* between the two flues. Between these steps are openings through which the hot gases from the fire pass and come in contact with the salt resting upon the steps, the gases also passing around the lower end of the hopper G, and finally up into the flue or chimney F. The steps *i* incline downward toward the furnace, so as to cause the fused or melted salt to run down into the receptacle B, where the impurities settle to the bottom with the purer salt in a state of fusion on the top.

In the side of the vessel B is a tap-hole, through which from time to time the dross and the purified salt are separately drawn off into suitable receptacles or molds.

H is a tube through which a rod is occasionally thrust to see when the salt in the receptacle is deep enough for drawing off. At the upper end of the flue D is placed a valve or damper E, which when closed causes the heat to pass through the spaces between the steps, but when opened, (as for instance in starting a fire,) allows the products of combustion to pass directly to the chimney. With the valve closed salt is fed through the hopper onto the uppermost step, and as the body of salt works its way down the flue C from step to step it is subjected to the action of heat, (varying from 900° to 1,430° Fahrenheit,) the degree of heat increasing as the salt continues its travel, so that by the time the salt reaches the lowermost step it will run therefrom into the receptacle B in a fused or molten condition. The crucible or receptacle B, being located in proximity to the fire, is kept at a high temperature to prevent the cooling of the fused salt therein.

The process just described is that which is employed in reducing comparatively coarse mined or rock salt; but where the salt to be melted is in the form of a powder the door of the ash-pit should be closed and an artificial but gentle air-blast injected under the grate, so as to force the hot gases from the fire through the powdered salt on the steps *i*.

An alkali or alkaline material may be mixed with the salt prior to its fusion or subsequently thereto, and may also be applied in a hydrated or anhydrous state; or the alkalies may, before or at the time of using, be combined with weak acids, such as silica or carbonic acid. Some of the alkalies and their compounds that may be used alone or two or more together are lime, magnesia, strontia, soda, and potash, their silicates, carbonates, and hydrates, or such substances in an anhydrous caustic state. In practice we have found caustic lime, either hydrated or anhydrous, as good as anything else, and find that the quantity required is from one-half of one per cent. to two per cent. of lime to ninety-nine and one-half to ninety-eight per cent. of salt. These proportions may, however, be varied somewhat.

In using the silicate or the carbonate of lime more time is required to produce the proper effect upon the salt than is required in using lime in the caustic state. Dolomitic or magnesian lime made from magnesian limestone—a natural rock composed of lime and magnesia carbonates—is found to answer quite as well as the pure lime. Pure magnesia, magnesia carbonate, soda, and potash also work well in purifying and whitening salt, but their cost far exceeds that of the lime.

In using the alkali or materials of an alkaline nature they may be sprinkled over or distributed through the salt before it is fused; or the powdered alkali may be thrown onto or stirred into the salt after fusion. After the salt containing the alkali is fused and run into a large infusible crucible or receptacle we allow it to stand from five to thirty minutes to give time for the alkali to act on the salt. We then draw off the dregs or impurities which had previously settled to the bottom and then draw off the purified salt from the bottom of the receptacle containing it. When a smaller percentage of alkali is used, it is necessary for the fused salt to stand a longer time to settle the impurities and to give the desired effect.

Instead of sprinkling the salt with a powdered alkali or mixing the alkali with the previously-fused salt the alkali may be worked into the basic material or lining of the furnace and crucible in larger proportion than we would otherwise use, and this extra-strongly basic lining and material will of itself whiten the salt, but it takes more time than when the powdered alkali is mixed with the salt direct. When the proportion of lime or magnesia in this lining mortar is very large, the composition will not readily fuse by contact with the melted salt, and at the same time will cohere sufficiently not to break down.

To save fuel, we prefer to conduct the hot gases from the fire into direct contact with the salt to be melted, such dust or soot as gets into the melted salt settling with the other impurities in the bottom of the fused-salt crucible or receptacle.

A furnace which will produce carbonic-oxide or carbon-monoxide gas and hydrogen can be substituted for the furnace shown; the heat escaping from the furnace after passing through and over the salt being recovered as in a Siemens regenerative furnace. Natural gas and petroleum may also be employed; but if petroleum is used it would be preferable to convert it into vapor before bringing it to the place of combustion.

We would also mention that while we prefer that the alkaline matters be used prior to the removal of the fused salt from the receptacle or crucible such a course is not essential, as it can obviously be applied afterward by thoroughly mixing it with the melted salt or coating the molds into which it is poured.

The formation of fusible silicates is prevented by constructing all those parts of the furnace that come in contact with the salt of a strongly basic infusible composition, made of a mixture of four parts of lime to one part of good clay, as free from iron as possible. By the use of this mixture the decomposition of the salt and the formation of soda silicate is avoided by reason of the superior attraction of the lime for the little silica in the clay with which it is mixed. The fused salt not coming in contact with any silica with which it can react, remains unchanged so far as the formation of silicate of soda is concerned, all of which becomes a matter of the utmost importance when it is considered that no other substance (except, perhaps, some virulent poison) could be more injurious to the salt. When the quantity of soda silicate is so small that it will form a heavy insoluble precipitate with the impurities in the salt, no injury will result because of the elimination of the silicate through such precipitation.

The term "lining" is used throughout this specification as meaning and including a protecting face or surface for the exposed parts of the apparatus, whether such protection be extended into or throughout the thickness or body of the chamber, furnace, or receptacle, or merely applied as a surface coating.

In the construction of furnaces the lining is commonly made in the form of bricks, and such a lining—that is, a lining of bricks of basic infusible material is comprehended in the present invention.

We are aware that within recent years a basic infusible lining has been employed in a Bessemer smelting-furnace because of the chemical affinity which the basic lining has for the phosphorus in the iron under treatment, and to this we make no claim.

Our invention resides in great part in the discovery that the chemical action of salt vapors upon a furnace or vessel may be prevented from taking place by the employment of a furnace, vessel, or chamber formed of or lined with a basic infusible substance, which, by reason of its inert qualities, not only preserves the furnace from destruction, but also precludes the formation of a fusible silicate of soda, the presence of which would render the salt practically useless and unmarketable.

By our process we produce a table-salt chemically pure, and consequently non-hygroscopic, and this, too, at a cost less than by the evaporation process now universally used.

This application is a division of an application filed by us February 9, 1891, Serial No. 380,783, and no claim is intended to be made herein to the form of the furnace or chamber in which the salt is fused; neither do we claim, broadly, in this application the method of purifying salt by subjecting the same to the action of heat and of a material of an alkaline nature, except when this operation is performed in a chamber, furnace, or receptacle having its exposed surfaces protected by a basic infusible material, as the broader claim—that is, the carrying out of the aforesaid method regardless of such protection of exposed surfaces—is embraced in our aforesaid application.

The process described in our aforesaid prior application, Serial No. 380,783, may be employed in connection with or carried out in a furnace or vessel having the basic infusible lining of the present case, and it is for this reason that the entire operation or the different modes of operation are set forth in the present application. The claims of this case are, however, restricted to the process as carried out in connection with the basic infusible material to protect the exposed parts of the apparatus, as above explained.

In practice it is found advantageous to perform the operation of purifying salt as a continuous process, the fire in such case being maintained for an indefinite period, and additional charges of salt being placed in the reducing vessel or chamber to replace the fused or purified salt drawn off.

The basic infusible lining once applied will last for a long period, and may last indefinitely. Hence it is to be understood that the step in the process or the act which consists in lining the furnace with a basic infusible material will not require to be repeated with each batch of salt or with each firing, but only when, if ever, the lining deteriorates and becomes incapable of resisting the action of the salt vapors.

Having thus described our invention, what we claim is—

1. The herein-described method of purifying salt, (chloride of sodium,) which consists in first lining a receptacle with a basic infusible material, such as described, next placing salt therein, and finally fusing the salt in said receptacle, whereby the salt is purified and the formation of silicates is prevented.

2. The method of purifying salt, (chloride of sodium,) which consists in the following steps, viz: lining a receptacle with a basic infusible material, as lime and clay, which will, by reason of its inert chemical qualities, prevent the formation of soda silicate and the destruction of the receptacle, placing salt in said receptacle, fusing the salt therein, and adding to the salt before or after fusion an alkaline material.

In witness whereof we hereunto set our hands in the presence of two witnesses.

CHARLES F. LAWTON.
ARTHUR W. LAWTON.
ALBERT L. LAWTON.

Witnesses to the signature of A. W. Lawton:
  M. H. BRIGGS,
  A. F. PHILLIPS.

Witnesses to the signatures of C. F. and A. L. Lawton:
  HORACE A. DODGE,
  WALTER S. DODGE.